United States Patent Office 3,177,685
Patented Apr. 13, 1965

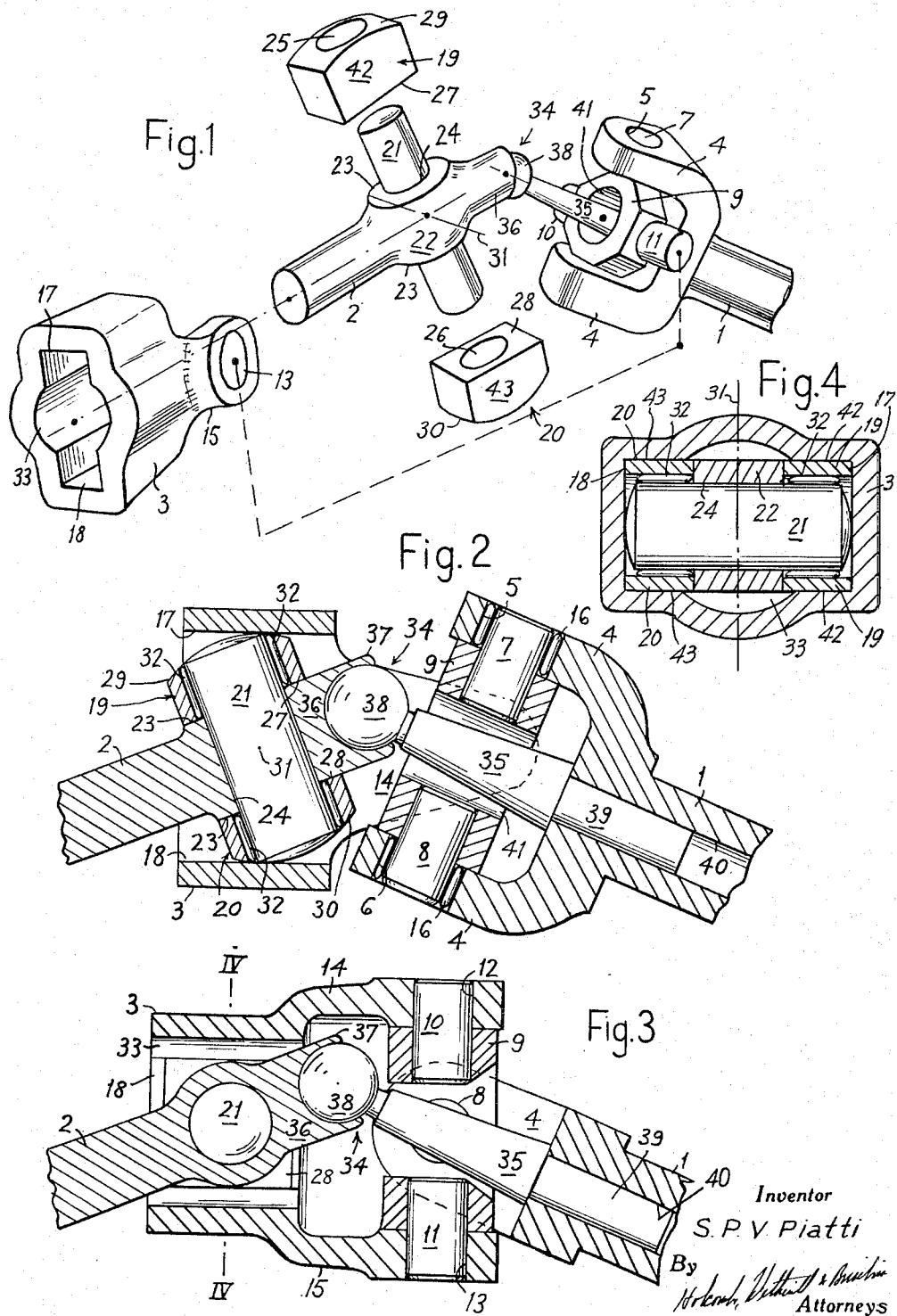

3,177,685
CONSTANT VELOCITY UNIVERSAL JOINTS
Sanzio Pio Vincenzo Piatti, 14 Corso Porta Nuova,
Milan, Italy
Filed Aug. 28, 1962, Ser. No. 219,889
Claims priority, application Great Britain, Sept. 1, 1961,
31,535/61
5 Claims. (Cl. 64—21)

The present invention relates to a constant velocity universal joint, also known as a homokinetic universal joint, that is a joint between a rotating input member and a rotating ouput member to be driven thereby, which is so constructed that irrespective of the angular inclination between the axes of rotation of the input and output members, within operating limits, the output member will rotate at exactly the same instantaneous speed as the input member.

With the simple Cardan joint unless the axes of rotation of both the input and output members are aligned, the instantaneous speed of the output member (when the input member is rotating at a uniform speed) will vary during each revolution, even though the average speeds of both members are equal. It is known that, subject to certain conditions, a constant velocity joint can be produced by connecting two Cardan joints in series, the output member of one joint being rigid with the input member of the other joint to form a central coupling element which is universally connected to the input and output members of the composite joint through intermediate coupling elements. The composite joint therefore comprises five elements, namely, the input and output members, the central coupling element and two intermediate coupling elements. The necessary conditions for constant velocity are:

(1) The axes of rotation of the input and output members shall lie in the same plane.

(2) The intermediate coupling elements can rock in a common plane with respect to the central coupling element and the input and output members, respectively, can rock with respect to the central coupling element in planes which are perpendicular to said common plane.

(3) The axes of rotation of the input and output members and the axis of rotation of the central coupling element shall form together an isosceles triangle; that is the axis of rotation of the central coupling element shall be perpendicular to the plane of symmetry between the axes of rotation of the input and output members.

The two first mentioned conditions present no difficulties in design. The present invention provides an improved arrangement for achieving the third condition.

In conventional "constant velocity" universal joints, a central coupling element is connected between an input and output member by Cardan joints and the input and output members are also coupled together by a ball joint between the ends of axial extensions from the adjacent ends of the members. As the input and output members are pivoted at fixed positions on the central coupling element, one of the extensions has to be variable in length to enable the members to pivot with respect to the central coupling element with the result that the third condition above is only achieved in one position of the input and output members when the extensions are equal in length.

The present invention has for an object to provide an improved arrangement in which the third condition above is achieved at all inclinations between the axes of rotation of the input and output members within the operating limits of the joint.

According to the present invention the adjacent ends of the input and output members are coupled together by a ball or equivalent joint, the distances between the centre of said ball joint and the axes about which the members rock relative to the central coupling element being equal and one of the intermediate coupling elements being also slidable with respect to the central coupling element in the direction of its axis of rotation.

In order that the present invention may be more readily understood, reference will now be made to the accompanying drawings, in which:

FIGURE 1 is an exploded perspective view of one embodiment of joint according to the invention;

FIGURE 2 is a longitudinal section through the assembled joint of FIGURE 1;

FIGURE 3 is a longitudinal section through the joint of FIGURE 2 taken from the same direction but after the joint has been rotated through 90°; and FIGURE 4 is a transverse section on the line IV—IV of FIGURE 3.

Referring to the drawings, the joint shown comprises input and output shafts 1 and 2, and a central coupling element 3. The shaft 1 is terminated in a fork 4 having aligned bearing apertures 5 and 6 for one of the pairs of aligned pivot pins, in this case the pins 7 and 8, of a cross 9 forming an intermediate coupling element. The other pair of aligned pivot pins, pins 10 and 11, pivot in aligned bearing apertures 12 and 13 formed, respectively, in spaced arms 14 and 15 of the central coupling element 3. The pins 7, 8, 10 and 11 may be rotatably mounted in needle bearings 16 in their respective bearing apertures as shown in FIGURE 2.

The central coupling element 3 is formed with two opposed slideways 17 and 18 for sliders 19 and 20 which are pivotally mounted on a pin 21. The slideways extend longitudinally of the central coupling element, as shown, so that the axis of the pin 21 is in the same plane as the axis of the pins 7 and 8. The pin 21 and sliders 19, 20 together form the second intermediate coupling element.

The shaft 2 is provided with a widened, part-spherically shaped boss portion 22 having opposed flat faces 23. The boss portion has an aperture 24 extending therethrough from the flat faces so that the axis of the aperture is at right angles to the axis of the shaft 2. The pin 21 is a force fit in the aperture 24.

The sliders 19 and 20 have apertures 25 and 26, respectively, for receiving the pin 21, and have flat faces 27 and 28, respectively, which abut the flat faces 23 of the boss portion when the sliders are in position. The faces 29 and 30 of the sliders opposite the faces 27 and 28 bear against the bottom surfaces of the slideways and are cylindrically curved so that the shaft 2 can rock with respect to the central coupling element 3 about an axis 31 parallel to the axis of the pins 10 and 11. The length of the portions of the pin 21 extending outwardly from each side of the boss portion 22 is such, and the two ends of the pin are so shaped, that they do not interfere with the line of curvature of the faces 29 and 30 of the sliders. The sliders may be pivotally mounted on the pin 21 by means of needle bearings 32.

The space 33 between the slideways is enlarged transversely of the coupling element 3 for reception of the boss portion 22 and to allow the shaft 2 to pivot to a certain extent about the axis of the pin 21, as shown in FIGURE 3.

The shafts 1 and 2 are coupled together by a ball joint 34 between the ends of axial extensions 35 and 36 from the adjacent ends of the shafts. The socket 37 of the joint is formed in the end of the extension 36, which is integral with the shaft 2, while the ball 38 is formed on the end of the extension 35. The extension 35 comprises a member axially aligned with the shaft 1 and having a portion 39 secured in an axial bore 40 in the shaft 1. The extension 35 passes through an aperture 41 in the cross 9.

The distances between the centre of the ball joint 34 and the axes about which the shafts 1 and 2 rock relative to the central coupling element 3, that is the axis of the pins 7, 8 and the axis of the pin 21 are equal.

The drive from the input shaft 1 is transmitted to the output shaft 2 through the pivot pins 7, 8, 10 and 11, the central coupling element 3 and the sliders 19 and 20 and the pin 21. The sliders have bearing faces 42 and 43, respectively, which bear against the sidewalls of the slideways 17, 18 in order to transmit the drive from the central coupling element 3 to the shaft 2.

As can be seen from FIGURES 2 and 3, when the joint is assembled, the intermediate coupling elements 9 and 19, 20, 21 can rock relative to the central coupling element in a common plane, namely about the axis of the pins 10, 11 and the axis 31 respectively. The shafts 1 and 2 can also rock relative to the central coupling element 3 in planes which are perpendicular to said common plane, namely about the axis of the pins 7, 8 and the axis of the pin 21 respectively. Additionally, the intermediate coupling element 19, 20, 21 is free to slide in the slideways 17, 18 with respect to the central coupling element 3 in the direction of its axis of rotation. Thus, as the inclination between the axes of rotation of the shafts 1 and 2 changes, the position of the axis 31 moves towards or away from the axis of the pins 10, 11, and as the lengths of the extensions 35, 36 are equal, the axes of rotation of the input and output shafts 1 and 2 and the axis of rotation of the central coupling element 3 always form together an isosceles triangle.

It is to be understood that the invention is not limited to the embodiment hereinbefore described, modifications of which can be made without departing from the scope of the invention as defined by the appended claims.

I claim:

1. A constant velocity universal joint comprising rotatable input and output members, a central coupling element, a first intermediate coupling element pivotally connected to said central coupling element for rocking movement about a first axis fixed relative thereto and pivotally connected to one of said input and output members for rocking movement about a second axis at right angles to said first axis, a second intermediate coupling element connected to the other of said input and output members and arranged to slide and rock with respect to said central coupling element, said second intermediate coupling element being slidable in the direction of the axis of rotation of said central coupling element and being rockable with respect to said central coupling element about a third axis parallel to said first axis, and said second intermediate coupling element also permitting said other member to rock about a fourth axis at right angles to said third axis, and a ball joint coupling together the adjacent ends of said input and output members, the distance between the centre of said ball joint and said first and third axes respectively being at all time equal within the operating limits of the joint.

2. A joint as claimed in claim 1, wherein the ball joint is arranged between the ends of axial extensions from the adjacent ends of the input and output members.

3. A constant velocity universal joint comprising an input and an output member, a central coupling element, a first intermediate coupling element in the form of a cross having one pair of aligned arms at right angles to the other pair, means pivotally mounting said one pair of arms on the central coupling element, means pivotally mounting one of the input and output members on said other pair of arms, a second intermediate coupling element connected to the other of the input and output members and arranged to slide and rock in slideways in the central coupling element with its axis of rocking parallel to the pivoting axis of said one pair of arms of the cross, said second intermediate coupling element also permitting said other member also to rock about a further axis at right angles to said axis of rocking, and a ball joint coupling together the adjacent ends of the input and output members, the distances between the centre of said ball joint and the pivoting axis of said one pair of arms and said axis of rocking, respectively, being equal.

4. A joint as claimed in claim 3, wherein the ball joint is arranged between the ends of axial extensions from the adjacent ends of the input and output members, the axial extension from the member associated with the cross passing through an aperture in the centre of the cross.

5. A joint as claimed in claim 3, wherein the second intermediate coupling element comprises a pin secured to said other member with its axis in a common plane with the pivoting axis of said other pair of aligned arms of the cross, and a pair of sliders pivotally mounted respectively on the ends of said pin and engaged in a pair of opposed slideways extending longitudinally of the central coupling element, said sliders being shaped to permit said second intermediate coupling element to rock with respect to the central coupling element in said common plane.

References Cited by the Examiner

UNITED STATES PATENTS

| 2,087,364 | 7/37 | Trbojevich | 64—21 |
| 2,329,903 | 9/43 | Horne | 64—21 |
| 2,755,641 | 7/56 | Dunn | 64—21 |
| 2,983,119 | 5/61 | Glover | 64—21 |

ROBERT C. RIORDON, *Primary Examiner.*